(12) United States Patent
Admon

(10) Patent No.: US 11,847,090 B1
(45) Date of Patent: Dec. 19, 2023

(54) SPI BUS SYNCHRONIZATION

(71) Applicant: WINBOND ELECTRONICS CORPORATION, Taichung (TW)

(72) Inventor: Itay Admon, Pardes Hanna (IL)

(73) Assignee: WINBOND ELECTRONICS CORPORATION, Taichung (TW)

( * ) Notice: Subject to any disclaimer, the term of this patent is extended or adjusted under 35 U.S.C. 154(b) by 0 days.

(21) Appl. No.: 17/844,764

(22) Filed: Jun. 21, 2022

(51) Int. Cl.
*G06F 13/42* (2006.01)
*G06F 13/37* (2006.01)

(52) U.S. Cl.
CPC .......... *G06F 13/4295* (2013.01); *G06F 13/37* (2013.01); *G06F 2213/0002* (2013.01)

(58) Field of Classification Search
CPC ............. G06F 13/4295; G06F 13/37; G06F 2213/0002
See application file for complete search history.

(56) References Cited

U.S. PATENT DOCUMENTS

| | | | |
|---|---|---|---|
| 6,707,914 B1* | 3/2004 | Bell | H04L 9/12 380/46 |
| 8,656,063 B1 | 2/2014 | Lin | |
| 9,910,676 B1 | 3/2018 | Sivaraman Nair et al. | |
| 11,334,515 B1* | 5/2022 | Vonbank | G06F 11/076 |
| 2011/0135312 A1* | 6/2011 | El-Ahmadi | H04J 3/1658 714/752 |
| 2014/0225630 A1* | 8/2014 | Stethem | F41H 13/0018 324/691 |
| 2016/0254924 A1* | 9/2016 | Hartwich | H04L 69/10 370/468 |
| 2019/0332137 A1* | 10/2019 | Benjamini | G06F 13/4282 |
| 2021/0303503 A1 | 9/2021 | Remple et al. | |

FOREIGN PATENT DOCUMENTS

| | | | | |
|---|---|---|---|---|
| CN | 1200513 A | * | 12/1998 | ............. G11C 29/08 |
| CN | 1662008 A | * | 8/2005 | |
| CN | 100407720 C | * | 7/2008 | ............. H04J 3/085 |

OTHER PUBLICATIONS

Translation of CN-1662008-A (Year: 2005).*
Translation of CN-100407720-C (Year: 2008).*
Translation of CN-1200513-A (Year: 1998).*
Winbond, "W25Q256JV_DTR: 3V 256M-BIT—Serial Flash Memory with DUAL/QUAD SPI, QPI & DTR", Datasheet, revision G, pp. 1-118, Dec. 29, 2020.
Dhaker, P., "Introduction to SPI Interface", Analog Dialogue 52-09, pp. 1-5, Sep. 2018.
Winbond, "W25Q256JW_DTR: 1.8V 256M-BIT—Serial Flash Memory with DUAL/QUAD SPI, OPI & DTR", Datasheet, revision K, pp. 1-122, Mar. 17, 2021.
Winbond, "W25N01JWxxxG/T: 1.8V 1G-BIT—Serial SLC NAND Flash Memory DUAL/QUAD SPI with 166MHZ STR & 80MHZ DTR Buffer Read & Continuous Read", Datasheet, revision C, pp. 1-91, May 24, 2021.

* cited by examiner

*Primary Examiner* — Henry Tsai
*Assistant Examiner* — John B Roche
(74) *Attorney, Agent, or Firm* — KLIGLER & ASSOCIATES PATENT ATTORNEYS LTD

(57) ABSTRACT

A method for Serial Peripheral Interface (SPI) operating-mode synchronization between an SPI host and an SPI device, which communicate over an SPI bus, includes predefining, in the SPI device, one or more values on the SPI bus as indicative of lack of synchronization of an SPI operating mode between the SPI host and the SPI device. Re-synchronization of the SPI operating mode is initiated in response to receiving any of the predefined values in the SPI device.

24 Claims, 6 Drawing Sheets

FIG. 3 parallel decoding

FIG. 4 manual sync

SPI BUS SYNCHRONIZATION

FIELD OF THE INVENTION

The present invention relates generally to Serial-Peripheral Interface (SPI) bus, and particularly to methods and systems for the detection and recovery of synchronization loss in SPI communication.

BACKGROUND OF THE INVENTION

Serial Peripheral Interface (SPI) and its derivatives are commonly used in the industry, mostly for short range inter-component communication. In "Introduction to SPI Interface" (P. Dhaker, Analog Dialogue 52-09, September 2009) the author describes legacy SPI, including four modes of operation and provides examples of serial, parallel and daisy-chain configurations. Winbond datasheet W25Q256JW (Revision K, Mar. 17, 2021) is a datasheet of an SPI flash device, including a description of enhanced SPI operating modes.

SUMMARY OF THE INVENTION

An embodiment of the present invention that is described herein provides a method for Serial Peripheral Interface (SPI) operating-mode synchronization between an SPI host and an SPI device that communicate over an SPI bus. The method includes predefining, in the SPI device, one or more values on the SPI bus as indicative of lack of synchronization of an SPI operating mode between the SPI host and the SPI device. Re-synchronization of the SPI operating mode is initiated in response to receiving any of the predefined values in the SPI device.

In a disclosed embodiment, one or more wires of the SPI bus are connected to pull-up or pull-down devices that force the one or more wires to a defined logic state, and the one or more values indicative of the lack of synchronization include the one or more values in which the one or more wires are at the defined logic state. In an embodiment, the one or more values indicative of the lack of synchronization include a predefined sequence of values that is pre-coordinated between the SPI host and the SPI device.

In another embodiment, the one or more values indicative of the lack of synchronization are pre-coordinated between the SPI host and the SPI device. In yet another embodiment, the method further includes sending one or more of the predefined values by the SPI host, so as to cause the SPI device to initiate the re-synchronization. In an example embodiment, the one or more predefined values include one or more SPI instruction codes in which a predefined group of bits is at a defined logic state.

In an embodiment, the one or more predefined values include one or more SPI address codes in which a predefined group of bits is at a defined logic state. In another embodiment, the method further includes, in the SPI device, aborting a current operation without responding to the SPI host. In some embodiments, initiating the re-synchronization includes reverting, in the SPI device, to a default SPI operating mode. In an embodiment, the default SPI operating mode is a single-wire, 24-bit address, non-Execute-In-Place (non-XIP) operating mode.

In yet another embodiment, the method further includes, in the SPI device, decoding SPI instructions concurrently in a default SPI operating mode and in a current SPI operating mode, and initiating the re-synchronization includes reverting to the default SPI operating mode upon receiving any of the predefined values.

In some embodiments, the lack of synchronization includes a mismatch with respect to at least one of (i) a number of wires of the SPI bus used for communication, (ii) use of Execute-In-Place (XIP) operating mode, and (iii) a number of bits used in SPI address codes.

There is additionally provided, in accordance with an embodiment of the present invention, an apparatus including a Serial Peripheral Interface (SPI) host and an SPI device. The SPI device is configured to communicate with the SPI host over an SPI bus, and, in response to receiving, on the SPI bus, any of one or more values, which are predefined in the SPI device as indicative of lack of synchronization of an SPI operating mode between the SPI host and the SPI device, initiate re-synchronization of the SPI operating mode.

The present invention will be more fully understood from the following detailed description of the embodiments thereof, taken together with the drawings in which:

DETAILED DESCRIPTION OF EMBODIMENTS

Overview

Figure 1:
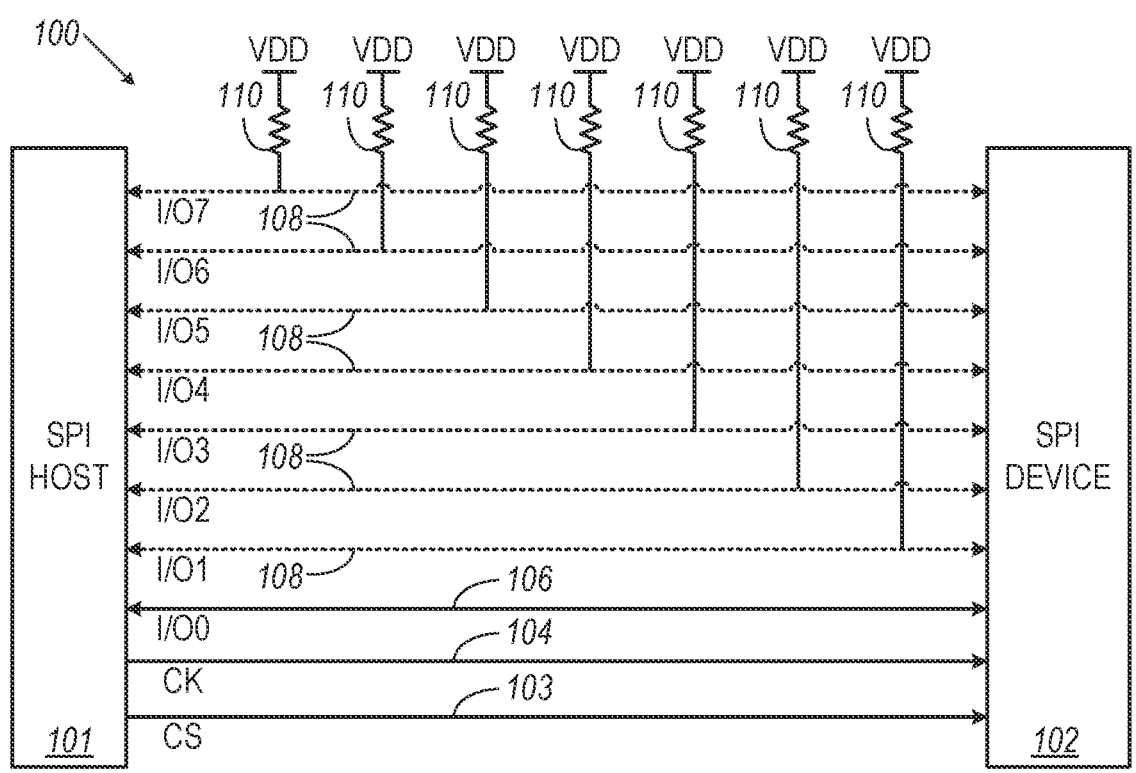
FIG. 1 is a block diagram that schematically illustrates an SPI communication system with Lost-Sync detection and recovery, in accordance with an embodiment of the present invention.

Serial Peripheral Interface (SPI) is a synchronous communication protocol that has been in use since 1979. Originally, the protocol defined a clock wire and two unidirectional data wires for duplex communication between an SPI host and an SPI device. Over the years, however, variants of the protocol evolved, to better fit some of the many SPI applications.

The two endpoints of an SPI connection are typically referred to as "SPI master" and an "SPI slave". In the present disclosure, "SPI master" is also referred to as "SPI host", and "SPI slave" is also referred to as "SPI device".

For example, the SPI interface is widely used for communication between a processor and an SPI flash device, wherein the processor (acting as an SPI host) sends predefined opcodes and addresses to the flash (acting as an SPI device) and, for some of the opcodes, the SPI device returns data.

SPI was originally defined as a single-bit format, where all instruction phases (command, address and data) are sent using a single wire (1-b). This mode is referred to as 1-1-1. To improve performance, the SPI was then extended to Quad and Octal SPI, wherein the command opcode is sent using 1-b, and other phases are sent using 4 or 8 bits (referred to as 1-4-4 and 1-8-8, respectively). At a later stage, new bus modes were added, including Quad Peripheral Interface (QPI) and Octal Peripheral Interface (OPI). In QPI all instruction phases are sent using 4 bits (4-4-4), whereas in OPI all phases use 8-bit (8-8-8). Additionally, an Execute-In-Place (XIP) mode of operation is sometimes used, wherein the SPI host does not send the opcode, and the SPI device assumes that the opcode does not change from the previous instruction. An SPI host or an SPI device that supports QPI or OPI also supports one (and typically only one) of the SPI modes (1-1-1, 1-4-4 or 1-8-8), which is referred to as the default SPI mode.

Thus, an SPI communication system may be in one of a plurality of operating modes, with regards to the number of data wires being used, the XIP mode being used and to other options (e.g., the number of address bits can be set to 24-bit or 32-bit). Typically, the SPI host sets the operating mode by sending an appropriate instruction to the SPI device. If, for some reason, the SPI host and the SPI device are not in the same mode ("not in synch"), erroneous operation may result.

Embodiments of the present invention that are disclosed herein provide for systems and methods to detect and recover from a loss-of-sync ("Lost-Sync") event. Loss-of-sync can occur, for example, when the SPI host changes the operation mode (e.g., because of a reset) and the SPI device remains in the previous mode.

In some embodiments, the SPI device is configured to detect that the SPI host has reverted unilaterally to a default-SPI mode (1-1-1, 1-4-4 or 1-8-8), for example due to reset. In an embodiment, weak pull-up devices (e.g., resistors, coupled to the positive supply) are wired to some of the data wires; if the SPI host transits to a default SPI mode (e.g., 1-1-1, 1-4-4 or 1-8-8), the SPI device will receive logic-high on the wires that are not in use in the single-SPI mode (e.g., I/O 1 through I/O7).

In some embodiments, opcodes that start with one or more set high order bits are not used, and can be defined as synchronization instructions; hence, if the SPI device receives set high order bits when expecting an opcode, the SPI device will determine that synchronization with the host has been lost, and unilaterally transit to the default SPI mode. In other embodiments, addresses that start with one or more set high order bits are defined as illegal, and, if the SPI device receives set high order address bits while expecting an address (e.g., while in XIP mode) the SPI device will identify that synchronization was lost and transit to a default SPI mode. When synchronization loss is detected while the SPI device is in XIP mode, the SPI device will abort the current XIP operation without responding to the SPI host, thus avoiding possible bus contentions.

In an embodiment, to avoid loss of data pertaining to the first received default SPI-mode instruction after the host SPI changes its mode, the SPI device comprises parallel decoding circuitry, which decodes the SPI communication in the currently-configured mode of operation and, in parallel, in the default SPI mode. When the SPI device detects a Lost-Sync event, the SPI device will execute the decoded default-mode instruction.

In yet another embodiment, a unique mode-reset sequence is defined, in which all I/O wires of the SPI bus are set to logic-1 during a long (e.g., 16-clock pulses) period. In an embodiment, such a sequence cannot be sent as part of the proper operation and, hence, the SPI device can interpret it as a command to reset the operating mode to the default SPI mode.

Thus, in embodiments, by adding pull-up devices to I/O wires and/or by defining a unique mode-reset sequence, an SPI device can detect and recover from a lost sync event.

System Description

SPI communication between an SPI host and an SPI device may be done in a plurality of protocols and operating modes, which vary in the width of the data bus (in the various phases of the instruction), the length of the address field and an Execute-In-Place (XIP) mode (in which an implicit opcode is used).

Since some of the operating modes and protocols may coexist, we will use in the disclosures below the following definition:

SPI communication adheres to a bus-width operating mode, an address-width operating mode and an Execute-In-Place (XIP) operating mode. (Note that other publications may use different definitions, e.g., add the term "protocol".)

The bus-width operating mode should be one of the following:
(i) SPI, using a single data wire to communicate the instruction and one (Single SPI), four (Quad-SPI) or eight (octal SPI) for the address and data phases of the instruction (referred to as 1-1-1, 1-4-4 and 1-8-8, respectively),
(ii) Quad Peripheral Interface (QPI), using four wires in all phases of the instruction (4-4-4), and
(iii) Octal Peripheral Interface (OPI), using eight wires in all phases of the instruction (8-8-8).

The address-width operating mode should be one of (i) 24-bit address, or (ii) 32-bit address.

The XIP operating mode should be either On or Off.

We define a default interface mode as SPI (single, quad or octal), 24-bit address, XIP off. Both the SPI host and the SPI device typically start at the default mode following a reset.

In all cases, it is imperative that the SPI host and the SPI device will employ the same operating modes. If, due to some fault, the host and the device are in different operating modes (for example, if the host resets), the device may execute unwanted instructions, and the host may receive erroneous read data from the device. The event in which the SPI host operating mode changes while the SPI device operating mode does not (or vice-versa) will be referred to as a Lost-Sync event.

The embodiments disclosed herein refer to the detection of a Lost-Sync event, and the recovery thereof.

FIG. 1 is a block diagram that schematically illustrates an SPI communication system 100 with Lost-Sync detection and recovery, in accordance with an embodiment of the present invention. An SPI Host 101 (e.g., a processor) communicates over an SPI link with an SPI Device 102, the SPI link comprising a Chip-Select (CS) wire 103, a Clock (CK) wire 104, an Input-Output (I/O) 0 wire 106, and I/O1 through I/O7 wires 108.

The communication comprises executing SPI instructions, which may include sending an opcode, sending an address, sending and/or receiving data. An example of SPI instruction set can be found in Winbond W25N01JWxxxG/T SPI-Flash data sheet (Revision C, May 24, 2021), chapter 8.

According to the example embodiment illustrated in FIG. 1, I/O0 wire 106 is always used, wherein I/O1 through I/O 7 wires 108 (dashed lines) may be used in some or all phases of the instruction or may never be used.

To enable detection of Lost-Sync events, I/O wires 108 are coupled to Vdd (Supply-high voltage) through resistors 110. The resistors are designed so that, when the SPI device (or the SPI host) drives the corresponding wires low, the SPI host or device will prevail, and the wires will be set low; hence, the resistors are "weak-pull-up" devices.

If the host SPI is in SPI mode (1-1-1, 1-4-4 or 1-8-8), and if the SPI device does not drive the I/O bus, I/O1 through I/O7 wires 108 will be driven high during the opcode phase by the pull-up devices. If, according to the protocol, the SPI device does not expect high levels in some of I/O1 through I/O7, the device will interpret the received high level as an indication of a Lost-Sync event, and will take recovery measures (e.g., switch to the default SPI mode). We will describe below (with reference to further figures) how receipt of logic-high is not expected in various communication phases and, hence, can be interpreted as a detection of a Lost-Sync event.

Thus, according to the example embodiment illustrated in FIG. 1 and described hereinabove, pull-up resistors coupled to I/O1 through I/O7 may, when synchronization is lost, drive unexpected data on the inputs of the SPI device, which interprets the unexpected data as a Lost-Sync event and recovers thereof by reverting to the SPI default mode.

The configuration of SPI communication system 100 illustrated in FIG. 1 and described above is an example that is cited for the sake of conceptual clarity. Other configurations may be used in alternative embodiments. For example, if the SPI device supports 4-bit rather than 8-bit bus, only three pull-up resistors may be needed. In some embodiments, some, or all pull-up devices 118 may be in the SPI host; in other embodiments the pull-up devices may be in the SPI device and in yet other embodiments there may be pull up devices in either or all of SPI host 101, SPI device 102 and I/O wires 108.

As another example, in alternative embodiments, weak pull-down resistors (or other suitable pull-down devices) can be used instead of pull-up resistors. Generally put, the pull-up or pull-down devices force the relevant SPI wires to a defined logic state ("1" in the case of pull-up, "0" in the case of pull-down). When using pull-down devices instead of pull-up devices, the values indicative of sync loss should also be changed from "1" to "0", i.e., to the logic state forced by the pull-down devices. In yet another alternative embodiment, pull-down devices are used in combination with negative logic, wherein a low voltage level represents logic-high, and a high voltage level represents logic-low.

In an embodiment, multiple SPI devices may be coupled to a single SPI host, and in another embodiment multiple SPI hosts may be connected to one or more SPI devices.

Figure 2:
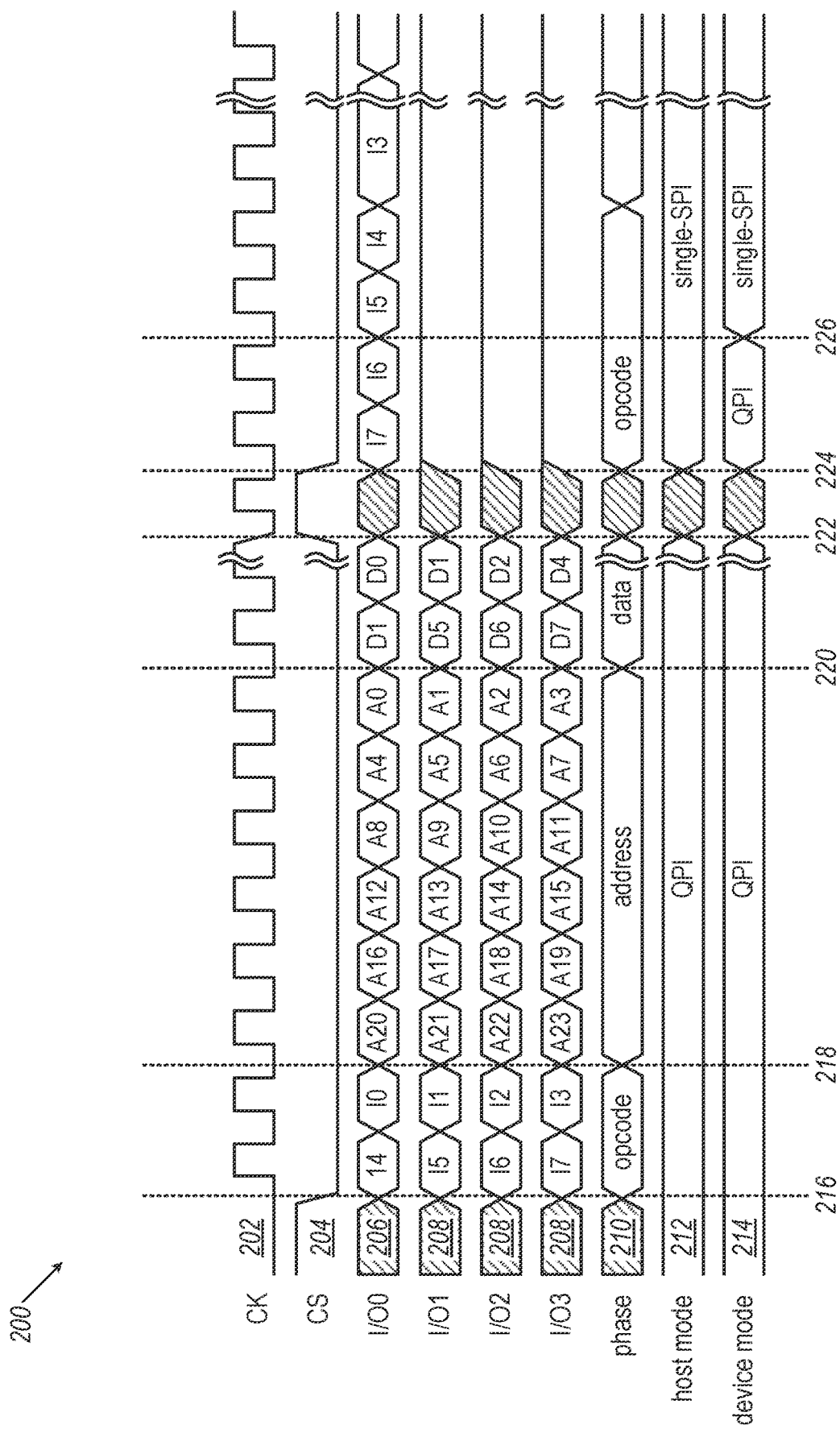
FIG. 2 is a waveform diagram that schematically illustrates a Lost-Sync event detection and recovery, in accordance with an embodiment of the present invention.

FIG. 2 is a waveform diagram 200 that schematically illustrates a Lost-Sync event detection and recovery, in accordance with an embodiment of the present invention. The waveform diagram includes a clock (CK) waveform 202 that continuously toggles during SPI (or QPI, OPI) instructions, a chip-select (CS) waveform 204 that is set low to define the boundary of the current instruction, An I/O0 waveform 206 that is in use in all phases (except when CS is inactive), I/O1 through I/O3 waveforms 208 that are used when the SPI host is in the QPI mode, a phase waveform 210 that indicates the phase of the instruction (opcode, address or data), a host mode waveform 212 indicating the host SPI mode, and, a device-mode waveform 214 that indicates the device SPI mode.

At a time-point 216, the host sets CS low, to indicate the start of a new instruction. Both the host and the device are in the QPI mode (e.g., responsively to a past set-mode instruction). The SPI host sends the opcode starting at time-point 216; then, at a timepoint 218, starts sending the address and, at a timepoint 220, sends the data.

The instruction ends at a time-point 222 wherein the SPI Host sets CS high and stop the clock. Then, at a time-point 224, the SPI host starts an SPI mode instruction. The SPI device misses the mode transition and remains in QPI.

When in SPI mode, the SPI host does not drive I/O wires 1 through 3, but, since the wires are coupled to pull-up devices 110 (FIG. 1), the I/O wires will assume a logic-high level. The SPI device will get set high order opcode bits; assuming the high order two bits of the current opcode are I7=0, and I6=0, the opcode that the SPI device will get will be 11101110 (0xEE). The SPI device will recognize this code as a lost-sync indication and, at a time-point 226, switch to SPI mode, recovering from the Lost-Sync event. (The period from time-point 224 to time-point 226 is the time that the device takes to detect the Lost-Sync event and to change the operating mode; we will show, with reference to further figures, how, in some embodiments, this period can be minimized or nulled.)

The waveform illustrated in FIG. 2 and described hereinabove is cited by way of example. Other waveforms may be used in alternative embodiments. For example, in some embodiments the bus-width operating mode between timepoints 216 and 218 may be Octal, and I/O wires 4 through 8 may be added. In some embodiments, the device may detect a Lost-Sync event instantaneously and revert to the default SPI mode in the same clock cycle (and, hence, time-points 224 and 226 merge). In embodiments the time difference between time-points 224 and 226 may be any suitable number of clock cycles.

Parallel Decoding

In embodiments, although the SPI device detects a Lost-Sync event and reverts to the default SPI mode, the Master may have already sent a first bit (or several first bits) of a default-SPI mode instruction; thus, although the host and the device will be in the same SPI mode, they will not be in sync time-wise (e.g., the second bit that the SPI host sends may be interpreted by the SPI device as a first bit of an instruction).

In some embodiments, to assure time-sync in case of lost-sync, the SPI device comprises parallel decoding circuitry.

Figure 3:
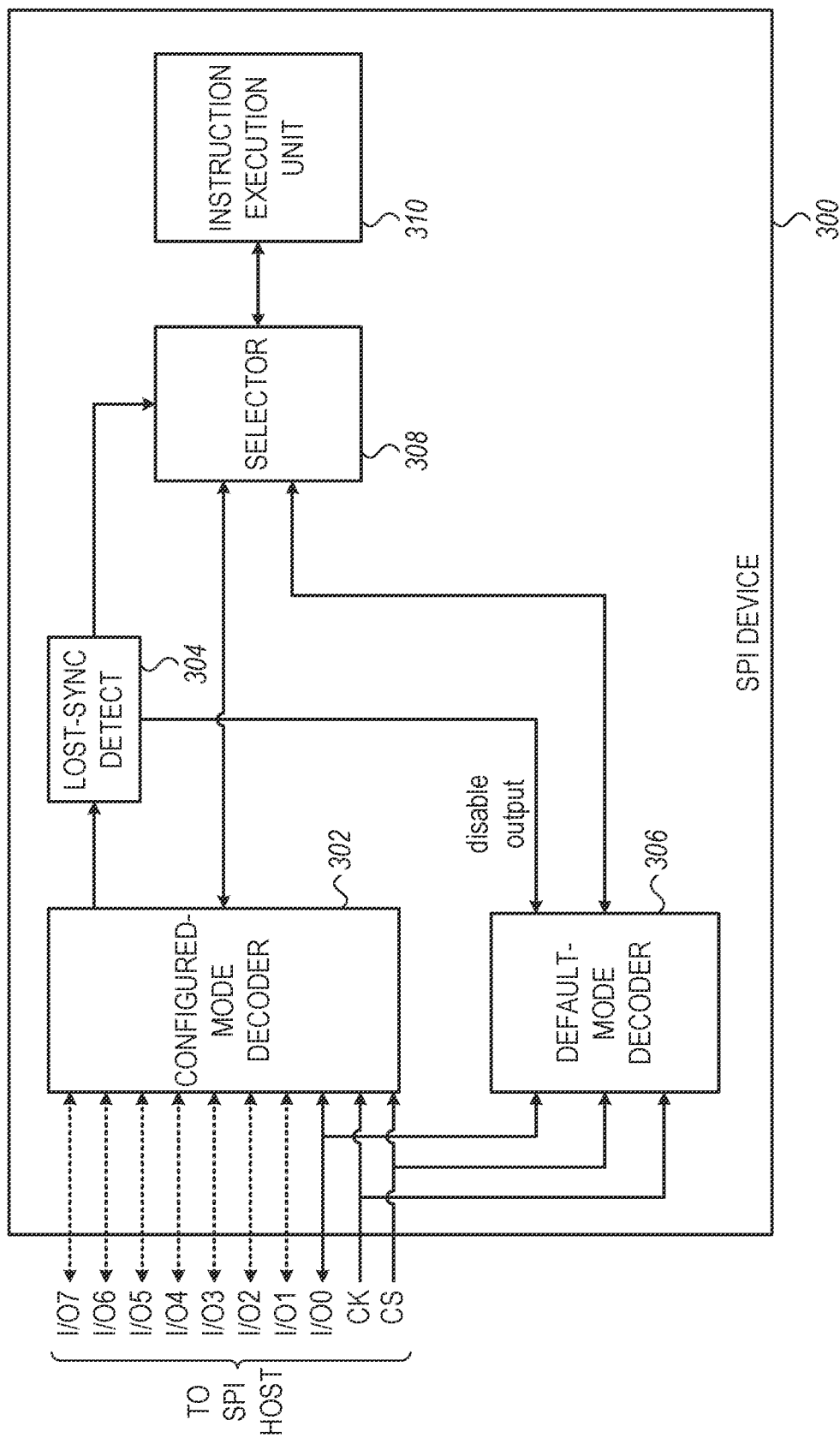
FIG. 3 is a block diagram that schematically illustrates an SPI device, in accordance with an embodiment of the present invention.

FIG. 3 is a block diagram that schematically illustrates an SPI device 300, in accordance with an embodiment of the present invention. The SPI device comprises a configurable decoder 302, which can decode SPI instructions in a default SPI mode (1-1-1, 1-4-4 or 1-8-8) and in either QPI (4-4-4) or OPI (8-8-8) (in some embodiments the SPI can decode instructions in both QPI and OPI). SPI device 300 further comprises a Lost-Sync detection circuit 304, which is configured to detect logic-high values on I/O wires when a logic low is expected, and to interpret the detection as a Lost-Sync event.

To improve Lost-Sync performance, SPI device 300 further comprises a default-mode decoder 306, which is coupled to I/O0 and configured to decode instructions that the SPI host sends, assuming that the SPI host is in a default SPI mode (1-1-1, 1-4-4 or 1-8-8). Thus, if the host unilaterally switches to the default-SPI mode (e.g., because of Reset), the default-mode detector will decode the instruction correctly, even though the SPI device is still in a non-default mode (e.g., OPI or QPI).

Lost Sync detection circuit 304 controls a Selector 308, which is configured to connect either the configured-mode decoder 302 or the default mode decoder 306, to an instruction execution unit 310, responsively to the detection of a Lost-Sync event.

Default-mode decoder 306 is configured to defer from driving I/O (e.g., responsively to a read instruction) when a Lost-Sync event is not detected; thus, if a non-default-mode instruction (or parts thereof) is interpreted as a default-mode read instruction, the default mode decoder will not disrupt proper operation.

Thus, according to the example embodiment illustrated in FIG. 3, SPI device 300 may recover from a Lost-Sync event with no loss of data.

The configuration of SPI device 300 illustrated in FIG. 3 and described above is an example that is cited for the sake of conceptual clarity. Other configurations may be used in alternative embodiments. For example, in some embodiments, default-mode decoder 306 is part of configured decoder 302; in an embodiment, SPI device 300 comprises parallel decoders for all allowed modes, and a mode-selection circuitry is added, to decide which decoder should be selected, responsive to the received instruction, to a reset input and to a detected Lost-Sync event.

Detecting Default-SPI Instruction while in QPI or OPI

When the SPI host drives an instruction Opcode while in SPI mode, the host drives I/O0 wire only, and does not drive the additional I/O wires that are used in higher bus width modes.

In this case, pull-up devices 110 (FIG. 1) will set the value of I/O1 through I/O3 or I/O1 through I/O7 to logic '1' when the SPI Master drives the instruction Opcode on IO/0.

If the SPI device (e.g., an SPI Flash device) expects an instruction in QPI or OPI mode, and decodes the incoming instruction Opcode accordingly, the device will assume all 4 (QPI) or 8 (OPI) wires carry valid Opcode bits. Since I/O1-I/O3 or I/O1-I/O7 are set to '1' by the pull-up-resistors, and only I/O0 is driven by the SPI host, the opcodes that the SPI device will receive and decode are limited to: 0xFF, 0xFE, 0xEF, 0xEE (the latter two are possible only in QPI mode, and the former two are possible in QPI or OPI modes).

This technique further requires that the SPI device will interpret Opcodes 0xFF, 0xFE, 0xEF and 0xEE as Lost-Sync indicators.

Proper Lost-Sync recovery that the SPI device should assume responsive to detecting a Lost-Sync event includes:

i) Set the SPI device to the default SPI mode, to properly decode further instructions.

ii) Optionally—use parallel default-mode decoding to reconstruct and execute the previous instruction.

Automatic Synchronization of XIP Mode

SPI communication may be in an XIP (Execute-In-Place) mode of operation, in which the SPI host skips the instruction Opcode phase, and the SPI device executes the Opcode of the previous instruction. This mode of operation saves time when the same instruction Opcode is executed repeatedly. When in XIP mode, the first byte of the instruction is the MS-Byte of the instruction address.

The SPI host signals XIP-On, e.g., by setting I/O0 to logic-high in the first cycle following the sending of the address associated with the instruction.

In embodiments, the SPI device detects a Lost-Sync scenario wherein the host sends an SPI mode instruction, while the SPI device is operating in QPI or OPI mode, with the XIP mode enabled. Since most SPI devices use only a small portion of the address space, the MS-bits of the address are expected to be 0. For example, when 32b addressing mode is used by a 256 Mbit SPI device (32 MByte), the largest possible address is 0x01FFFFFF, with the seven MS bits at logic 0.

In an embodiment, pull-up devices set I/O1 through I/O3 (or I/O1 through I/O7) to logic 1 when the SPI host is in the single-SPI mode. Hence, if the SPI device expects to receive an address while it is still in OPI or QPI mode, the most significant address byte will be 0xFF, 0xFE, 0xEF or 0xEE. In embodiments any address that starts with 0xFF, 0xFE, 0xEF or 0xEE is interpreted as a Lost-Sync event (in practice, it may be sufficient to define that the MS-bit of the address must be 0; this limits the memory size to 8 Mbyte in 24-bit address mode, and 2-Gbyte in 32-bit address mode).

In an embodiment, the SPI device, responsively to detecting a Lost-Sync event while in XIP mode, changes the operating mode to the default SPI mode (with XIP disabled) and, optionally, uses parallel decoding of the previous instruction, so as not to lose any instruction.

Manual Operating-Mode Synchronization

In some applications, it may not be possible to exclude address ranges that start with an FF, FE, EF or EE byte. In an embodiment, manual synchronization may be used, in which the SPI host sends a unique Mode-Reset sequence; the SPI device, when receiving the Mode-Reset sequence, unconditionally switches to the default SPI mode (no pull-up devices are needed).

In some embodiments, the Mode-Reset sequence is defined as a sequence of all-1 in all available I/O wires, for, for example, sixteen consecutive clock cycles. The SPI device decodes this instruction as opcode 0xFF followed by all-1 address and data, regardless of the current interface operating mode.

If XIP Mode is on and the addressing mode is 24-bit, the SPI device should define the single address (e.g., 0xFFFFFF) as illegal; if the addressing mode is 32 bit the SPI should define the single address (e.g., 0xFFFFFFFF) as illegal. In both cases, the SPI device will interpret the corresponding illegal address as Mode-Reset sequence and, responsively, switch to the default SPI mode.

It should be noted that since many SPI hosts use 16-bit or 32-bit aligned addresses, access to the specific address 0xFFFFFF or 0xFFFFFFFF is unlikely. Defining it as illegal address will have no or little impact on functionality.

When the SPI device detects the Mode-Reset sequence, the SPI device resets its SPI mode to the default SPI mode, thus, regaining synchronization with the SPI host.

Figure 4:
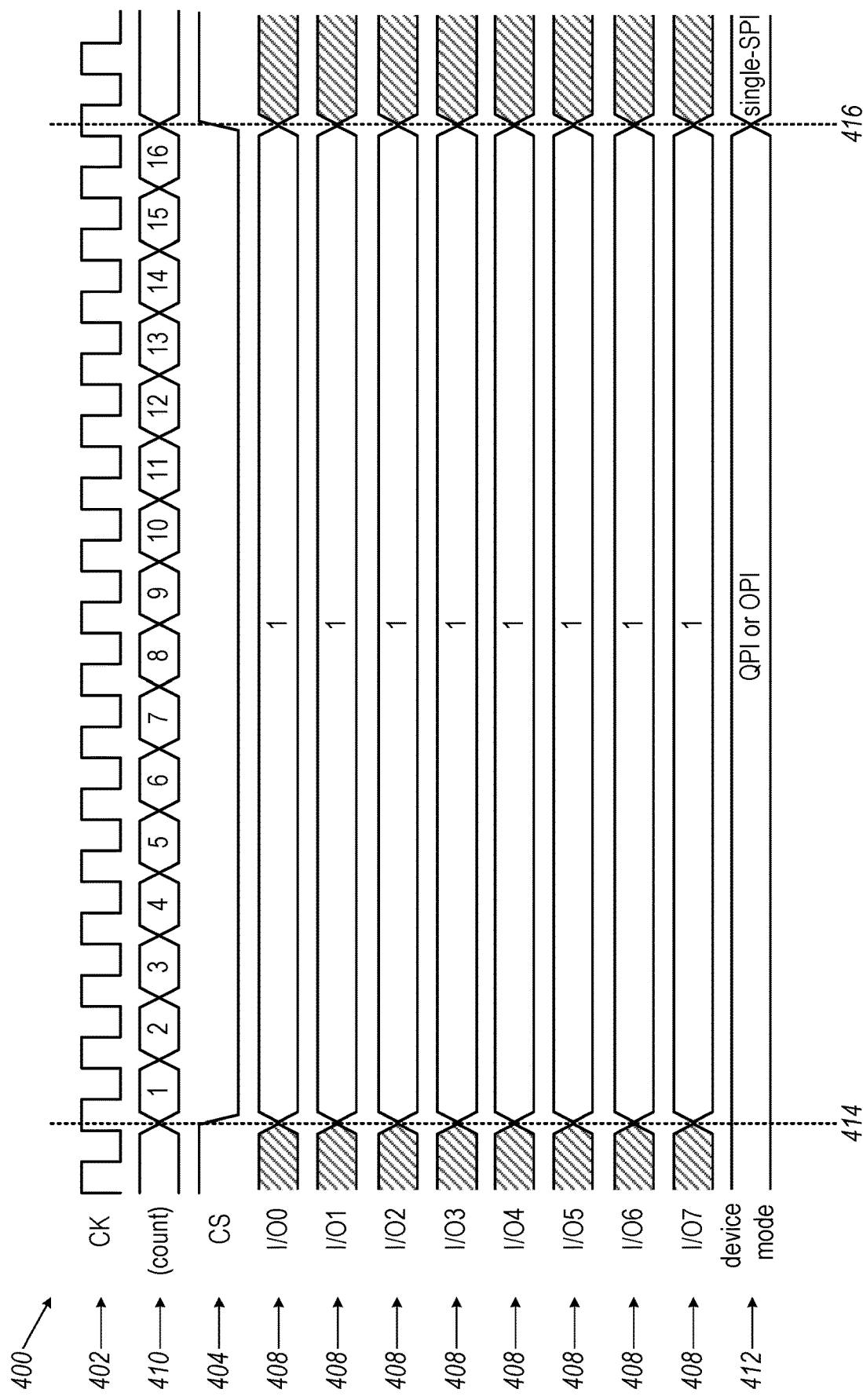
FIG. 4 is a waveform diagram that schematically illustrates sending a mode-reset sequence by an SPI host, in accordance with an embodiment of the present invention.

FIG. 4 is a waveform diagram 400 that schematically illustrates sending a mode-reset sequence by an SPI host, in accordance with an embodiment of the present invention.

The diagram comprises a clock waveform 402, which oscillates at all time, a CS waveform 404, which is set low to throughout the duration of the mode-reset sequence, waveforms 408, which illustrate the logic state of I/O0 through I/O8, and a count waveform 410, which counts the clock cycles during the mode-reset sequence (count waveform 410 is not associated with any SPI wire).

Waveform diagram 400 further comprises a device-mode indication waveform 412, which indicates the SPI device operating mode.

According to the example embodiment illustrated in FIG. 4, the SPI host, at a time-point 414, drives the CS wire low, to indicate an instruction. Then, during the next 16 clock cycles, the SPI host drives all I/O wires that are connected to the SPI device with logic-1, to indicate a mode-reset sequence. At a time-point 416, the mode-reset ends, and the SPI host set the CS wire to logic-1.

At time-point 414 the SPI device may be in any SPI operating mode, including, for example, QPI or OPI. At a time-point 416, after receiving a high on all I/O wires for sixteen consecutive clock cycles, the SPI device detects the SPI Mode-reset sequence and reverts to the default SPI mode.

Thus, the SPI host can force the SPI device to the default SPI mode, irrespective of the current SPI device operating mode.

Additional Embodiments and Variations

The polarities of the signals described hereinabove is an example that is compatible with the present SPI bus definition and applications. Embodiments of the present invention, however, are not limited to the polarities that are described hereinabove. For example, in some embodiments the CS wire is active-high rather than active-low. In another embodiments, I/O wires carry negative logic (that is—a logic-1 is signaled by a low voltage, whereas a logic-0 is indicated by a high voltage), and pull-down rather than pull-up devices are coupled to the I/O wires.

According to the waveform illustrated in FIGS. 2 and 4, the I/O wires and the CS wires change value with the rising edge of the clock (CK) wire, with no phase delay (CPOL=1, CPHA=0 in SPI nomenclature). Embodiments of the present invention, however, are not limited to CPOL=1 and CPHA=0—in embodiments, any combination may be used. In some embodiments a DDR SPI signaling is used, wherein the I/O wires change at both edges of the clock wire.

Lastly, embodiments of the present invention support SPI variants wherein the bus width (number of I/O wires) is different than 1, 2, 4 or 8. For example, in an embodiment, the disclosed techniques, mutatis mutandis, may be used in an SPI variant having 16 I/O wires.

Method Description

Figure 5:
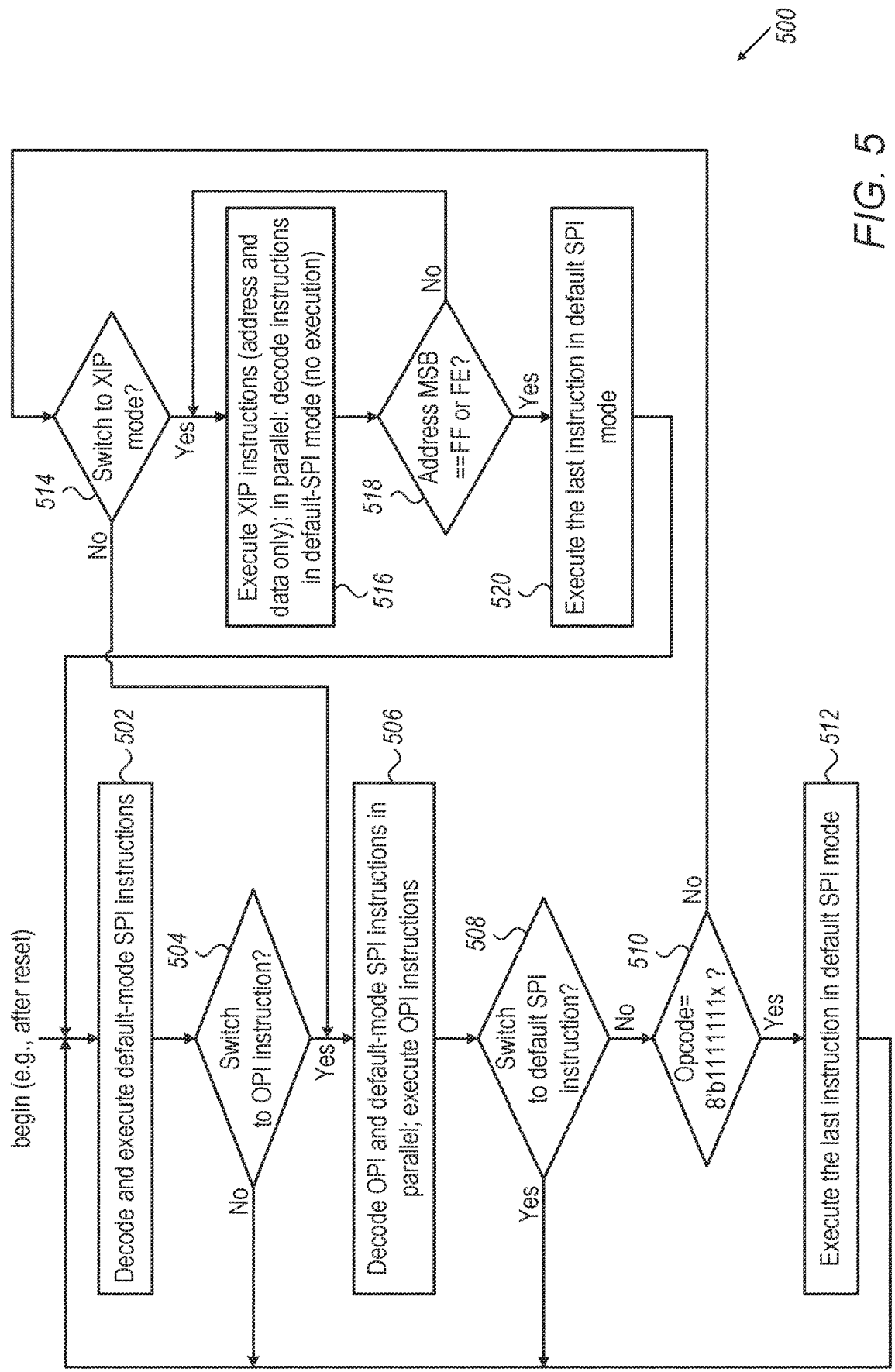
FIG. 5 is a flowchart that schematically illustrates a method for detecting Lost-Sync event by examining the input data, in accordance with an embodiment of the present invention.

FIG. 5 is a flowchart 500 that schematically illustrates a method for detecting Lost-Sync events by examining the input data, in accordance with an embodiment of the present invention. The flowchart is executed by an SPI device.

The flowchart starts at a default-mode execution operation 502, wherein the SPI device decodes and executes SPI instruction in the default SPI mode (single, quad or octal). The SPI device enters operation 502 upon reset (for example, power-up reset).

Next, in a check-switch-to-OPI operation 504, the SPI device checks if the received instruction is a Switch-Mode instruction (e.g., switch to OPI mode), and, if it is not, reenters operation 502, to execute the next default-SPI mode instruction.

If, in operation 504, the received instruction is a switch-mode instruction, the SPI device enters a parallel-decode operation 506. While in the parallel-decode operation 506, the SPI device decodes the input instructions in the default SPI mode, and, in parallel—in the current OPI or QPI mode (as indicated by the last set-mode opcode). However, the SPI executes only the current-mode instructions, and stores the decoding of the default-SPI mode instruction.

After decoding an OPI instruction (and, in parallel, a default-SPI instruction) in operation 506, the SPI device checks, at a check-mode-switch-instruction operation 508, if the decoded instruction is a switch-to-default-SPI-mode instruction; if so, the SPI device reenters operation 502, to decode further instructions in the default SPI mode (according to the example embodiment illustrated in FIG. 5, the only allowed operation mode that follows an OPI operating mode is the default SPI mode; in other embodiments this may not be the case, and the flowchart changes accordingly).

If, in operation 508, the instruction is not a switch-mode instruction, the SPI device enters a check-111111x operation 510, and checks if the seven most-significant bits of the opcode are at logic-1. In embodiments, the two opcodes that start with seven set bits (0xFF and 0xFE) are not legal opcodes, and receipt of such opcodes is only possible if the host SPI does not drive I/O wires 1 through 7 (in which case the wires are pulled high by pull-up devices 110, FIG. 1).

If, in operation 510, the seven most significant I/O wires are at logic-1, the SPI device will enter a default-mode-execution operation 512 and execute the default-SPI mode instruction that was decoded (in parallel with the OPI mode instruction) in operation 506. Thus, no instruction will be lost. After operation 512 the SPI device reenters operation 502, to decode and execute further default-SPI instructions.

If, in operation 510 the seven MS bits of the opcode are not all logic-1, the SPI device will enter a check-switch-to-XIP operation 514, and check if the host SPI signals transition to XIP mode. In embodiments, the SPI host signals transition to XIP mode by setting I/O0=1 at the first clock cycle following the sending of the address. If, in operation 514, XIP is not signaled, the SPI device will reenter operation 506, to decode the next instruction in OPI mode; if XIP is signaled, the SPI device will enter an XIP execution operation 516, in which the SPI device will, in parallel, decode and execute XIP instructions (using the last sent opcode), and decode (but not execute) default-mode SPI instructions. After the decoding of each instruction, the SPI device will enter a check-FF-FE-address operation 518, to check if the MS byte of the address is an FF or an FE. In embodiments, the two addresses that start with seven set bits (0xFF and 0xFE) are not legal addresses (e.g., beyond the memory size), and receipt of such address is only possible if the host SPI does not drive I/O wires 1 through 7 (in which case the wires are pulled high by pull-up devices 110, FIG. 1).

If, in operation 518, the MS byte of the address is FE or FF, the SPI device reverts to the default SPI mode. To avoid losing the last single-SPI mode instruction, the SPI device, in a default-mode-execution operation 520, executes the last default-SPI instruction that was decoded in operation 516, and then reenters operation 502, to decode and execute further instructions in the default SPI mode.

The Lost-Sync detection flowchart illustrated in FIG. 5 and described hereinabove is cited by way of example. Other flowcharts may be used in alternative embodiments. For example, in some embodiments only the single most-significant bit of the I/O bus (I/O7) is checked for logic-1 in operation 510 (assuming all opcodes starting with MSB=1 are illegal). In embodiments, the SPI host switches to QPI rather than OPI. The SPI device, in operation 504, detects switch to QPI; in operation 506, decodes QPI (and, in parallel, default SPI); and, at operation 510, checks for "OpCode=8'b111x111x".

Figure 6:
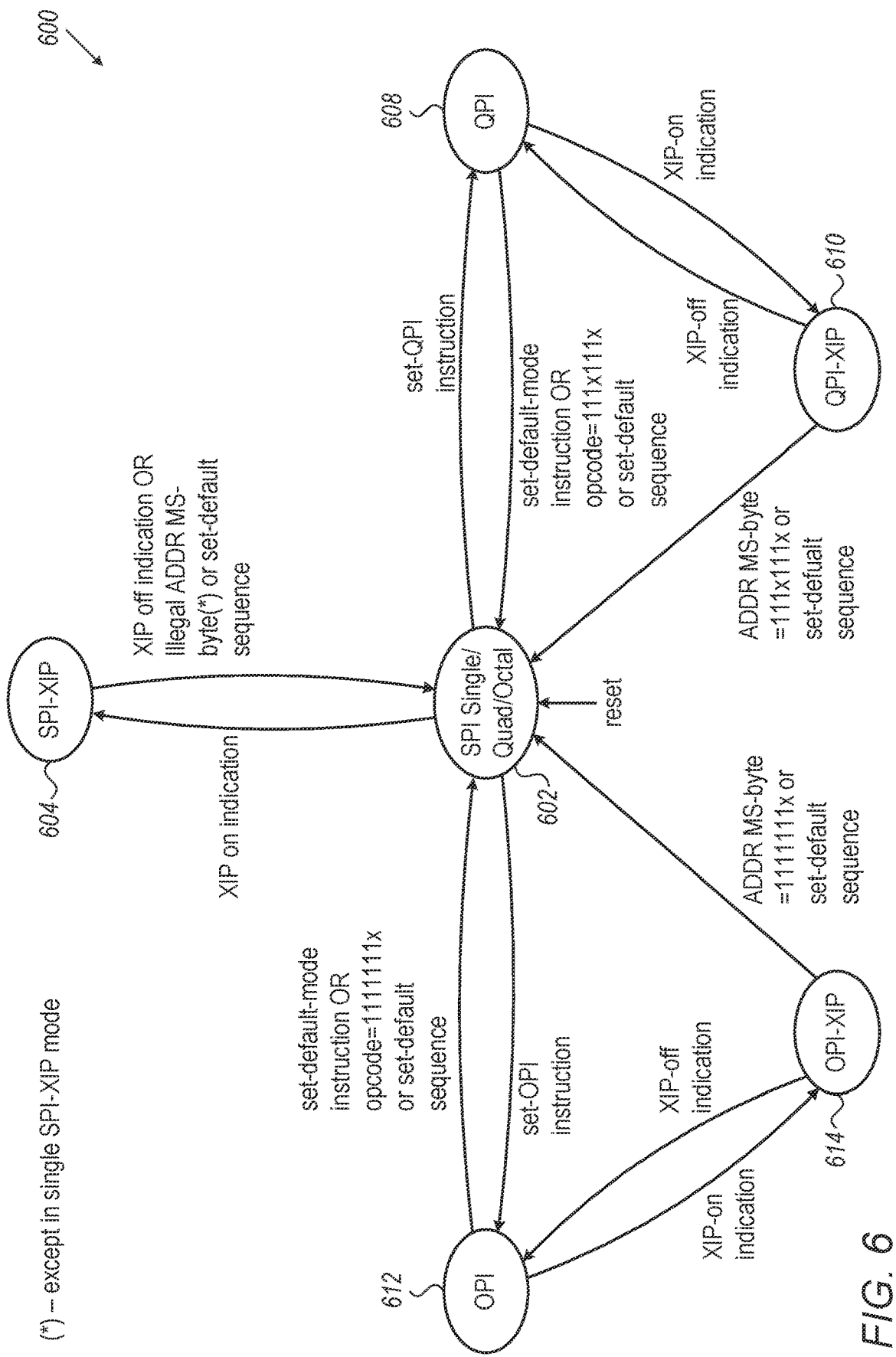
FIG. 6 is a state-diagram that schematically illustrates the states of an SPI device, in accordance with an embodiment of the present invention.

FIG. 6 is a state-diagram 600 that schematically illustrates the states of an SPI device, in accordance with an embodiment of the present invention. Each state in FIG. 6 represents an SPI, a QPI or an OPI operating mode:

1. An SPI state 602 can be single (1-1-1), quad (1-4-4) or octal (1-8-8) SPI;
2. An SPI-XIP state 604 (single-quad or octal SPI with XIP on);
3. A QPI state 608 (4-4-4);
4. A QPI-XIP state 610;
5. An OPI state 612 (8-8-8); and
6. An OPI-XIP state 614.

We will first describe "normal" transitions between the states, and then describe transitions in case of Lost-Sync, according to embodiments.

Following a Reset signal, the SPI device is in the SPI state 602. Responsively to an XIP-On indication (e.g., a set I/O0 in the first clock following the address) the SPI device transits to the SPI-XIP state 604, and, responsively to an XIP-off indication (e.g., a clear I/O0 in the first clock following the address), the SPI device reverts from SPI-XIP state 604 back to SPI state 602.

If the SPI device, while in default-SPI state 602, receives a set-mode-QPI or a set-mode-OPI instruction, the SPI device will transit, respectively, to QPI state 608 or to OPI state 610; when in QPI state 608 or OPI state 612, the SPI device will return to the default SPI state 602 upon receipt of a set-mode-SPI instruction.

When in either QPI state 608 or in OPI state 612, the SPI device may receive an XIP-On indication, and transit to QPI-XIP state 610 or to OPI-state 614, respectively. When in either the QPI-XIP state 610 or the OPI-state 614, the SPI device will, responsively to an XIP-off indication, revert, respectively, to QPI state 608 or to OPI state 612.

In embodiments, additional inter-state transitions are provided, to allow recovery from a Lost-Sync event. If the device is in SPI-XIP state and the host is in SPI (non-XIP) state, the SPI device will receive an address with at least the three MS bits set (driven high by pull-up resistors 110) and will, responsively, reverts to SPI mode 602.

If the SPI device is in QPI mode 608 while the SPI host is in SPI mode, the SPI device will receive an opcode with bits 5-6-7 and 3-2-1 at logic high (one of opcodes FF, FE, EF, EE—all defined, according to embodiments, as illegal) and, responsively, reverts to SPI mode 602.

Similarly, if in the OPI mode while the SPI host is in SPI mode, the SPI device will receive an opcode with bits 1 through 7 at logic high (one of opcodes FF, FE), and responsively revert to SPI mode 602.

If sync is lost while the SPI device is in the QPI-XIP state 610 or the OPI-XIP state 614, the SPI device will get an address with MS byte equal FF or FE (for the OPI-XIP case) or FF, FE, EF or EE for the QPI-XIP case. Responsively, the SPI device will revert to the corresponding QPI or OPI state. Similarly, if sync is lost while the SPI device is in the SPI-XIP state 604, the SPI device will respond to an address that starts with one of FF, FE (for Octal-SPI) or one of FF, FE, EF or EE (for quad-SPI) by reverting to the default SPI mode 602 (this method will not work to recover form lost sync in the case of single SPI-XIP).

Additionally, when detecting a set-default sequence (as described above), the SPI device, from any state, will transit to the default SPI mode 602.

The state-diagram illustrated in FIG. 6 and described hereinabove is an example that is cited merely for the sake of conceptual clarity. Other state diagram may be used in alternative embodiments. For example, states and substates may define the clock polarity and phase; in some embodiments, the SPI device may switch between states (other than XIP-on and off states) without going through the default state. In an embodiment, the default state may be any other suitable mode.

The configurations of SPI communication system 100, including SPI host 101, SPI device 102, pull-up devices 110, SPI device 300 and its components such as parallel decoding circuitry 300 and Lost-Sync detection 304, Mode-Reset sequence 400, the method of flowchart 500 and state diagram 600, illustrated in FIGS. 1 through 6 and described hereinabove, are example configurations, sequences, flowcharts and state diagrams that are shown purely for the sake of conceptual clarity. Any other suitable configurations, sequences, flowcharts, and state diagrams can be used in alternative embodiments.

The different sub-units of SPI host 101, SPI device 102, pull-up devices 110 and SPI device 300 may be implemented using suitable hardware, such as in one or more Application-Specific Integrated Circuits (ASICs) or Field-Programmable Gate Arrays (FPGAs), using software, using hardware, or using a combination of hardware and software elements.

SPI host 101 and/or SPI device (FIG. 1) and/or SPI device 300 (FIG. 3) may comprise one or more general-purpose processors, which are programmed in software to carry out the functions described herein. The software may be downloaded to the processor in electronic form, over a network or from a host, for example, or it may, alternatively or additionally, be provided and/or stored on non-transitory tangible media, such as magnetic, optical, or electronic memory.

Although the embodiments described herein mainly address detection and recovery of a Lost-Sync event in SPI communication, the methods and systems described herein can also be used in other applications.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for Serial Peripheral Interface (SPI) operating-mode synchronization between an SPI host and an SPI device that communicate over an SPI bus, the method comprising:

predefining, in the SPI device, one or more values on the SPI bus as indicative of a fault caused by the SPI host and the SPI device operating in different SPI modes; and in response to receiving any of the predefined values in the SPI device, initiating a re-synchronization process that causes the SPI host and the SPI device to operate in the same SPI operating mode.

2. The method according to claim 1, wherein one or more wires of the SPI bus are connected to pull-up or pull-down devices that force the one or more wires to a defined logic state, and wherein the one or more values indicative of the fault comprise the one or more values in which the one or more wires are at the defined logic state.

3. The method according to claim 1, wherein the one or more values indicative of the fault comprise a predefined sequence of values that is pre-coordinated between the SPI host and the SPI device.

4. The method according to claim 1, wherein the one or more values indicative of the fault are pre-coordinated between the SPI host and the SPI device.

5. The method according to claim 1, and comprising sending one or more of the predefined values by the SPI host, so as to cause the SPI device to initiate the re-synchronization process.

6. The method according to claim 1, wherein the one or more predefined values comprise one or more SPI instruction codes in which a predefined group of bits is at a defined logic state.

7. The method according to claim 1, wherein the one or more predefined values comprise one or more SPI address codes in which a predefined group of bits is at a defined logic state.

8. The method according to claim 1, and comprising, in the SPI device, aborting a current operation without responding to the SPI host.

9. The method according to claim 1, wherein initiating the re-synchronization process comprises reverting, in the SPI device, to a default SPI operating mode.

10. The method according to claim 9, wherein the default SPI operating mode is a single-wire, 24-bit address, non-Execute-In-Place (non-XIP) operating mode.

11. The method according to claim 1, and comprising, in the SPI device, decoding SPI instructions concurrently in a default SPI operating mode and in a current SPI operating mode, wherein initiating the re-synchronization process comprises reverting to the default SPI operating mode upon receiving any of the predefined values.

12. The method according to claim 1, wherein the fault comprises a mismatch with respect to at least one of:
a number of wires of the SPI bus used for communication;
use of Execute-In-Place (XIP) operating mode; and
a number of bits used in SPI address codes.

13. An apparatus, comprising:
a Serial Peripheral Interface (SPI) host; and
an SPI device, configured to:
communicate with the SPI host over an SPI bus; and
in response to receiving, on the SPI bus, any of one or more values, which are predefined in the SPI device as indicative of a fault caused by the SPI host and the SPI device operating in different SPI modes, initiate a re-synchronization process that causes the SPI host and the SPI device to operate in the same SPI operating mode.

14. The apparatus according to claim 13, wherein one or more wires of the SPI bus are connected to pull-up or pull-down devices that force the one or more wires to a defined logic state, and wherein the one or more values indicative of the fault comprise the one or more values in which the one or more wires are at the defined logic state.

15. The apparatus according to claim 13, wherein the one or more values indicative of the fault comprise a predefined sequence of values that is pre-coordinated between the SPI host and the SPI device.

16. The apparatus according to claim 13, wherein the one or more values indicative of the fault are pre-coordinated between the SPI host and the SPI device.

17. The apparatus according to claim 13, wherein the SPI host is configured to send one or more of the predefined values, so as to cause the SPI device to initiate the re-synchronization process.

18. The apparatus according to claim 13, wherein the one or more predefined values comprise one or more SPI instruction codes in which a predefined group of bits is at a defined logic state.

19. The apparatus according to claim 13, wherein the one or more predefined values comprise one or more SPI address codes in which a predefined group of bits is at a defined logic state.

20. The apparatus according to claim 13, wherein the SPI device is configured to abort a current operation without responding to the SPI host.

21. The apparatus according to claim 13, wherein the SPI device is configured to initiate the re-synchronization process by reverting to a default SPI operating mode.

22. The apparatus according to claim 21, wherein the default SPI operating mode is a single-wire, 24-bit address, non-Execute-In-Place (non-XIP) operating mode.

23. The apparatus according to claim 13, the SPI device is configured to decode SPI instructions concurrently in a default SPI operating mode and in a current SPI operating mode, and to initiate the re-synchronization process by reverting to the default SPI operating mode upon receiving any of the predefined values.

24. The apparatus according to claim 13, wherein the fault comprises a mismatch with respect to at least one of:
a number of wires of the SPI bus used for communication;
use of Execute-In-Place (XIP) operating mode; and
a number of bits used in SPI address codes.

* * * * *